(12) United States Patent
Ikeda et al.

(10) Patent No.: US 9,430,928 B2
(45) Date of Patent: Aug. 30, 2016

(54) POWER TOOL SYSTEM

(71) Applicant: Panasonic Intellectual Property Management Co., Ltd., Osaka (JP)

(72) Inventors: Masaki Ikeda, Mie-ken (JP); Tatsuya Miwa, Mie-ken (JP); Naoki Tsuruta, Mie-ken (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/633,355

(22) Filed: Feb. 27, 2015

(65) Prior Publication Data
US 2016/0005295 A1    Jan. 7, 2016

(30) Foreign Application Priority Data
Jul. 1, 2014    (JP) ................ 2014-136098

(51) Int. Cl.
| | |
|---|---|
| *G08B 1/08* | (2006.01) |
| *G08B 21/18* | (2006.01) |
| *B25F 5/00* | (2006.01) |
| *H04Q 9/00* | (2006.01) |

(Continued)

(52) U.S. Cl.
CPC ................ *G08B 21/18* (2013.01); *B25F 5/00* (2013.01); *H04L 67/125* (2013.01); *H04L 67/34* (2013.01); *H04Q 9/00* (2013.01); *H04W 88/04* (2013.01); *G08C 2201/93* (2013.01); *H04L 67/12* (2013.01); *H04Q 2209/40* (2013.01)

(58) Field of Classification Search
CPC .. G08B 13/1427; G08B 1/08; G05B 13/028; G08C 17/00; H04M 1/575; H04M 1/7253; B25F 5/00; B25F 5/02

USPC ........ 340/573.1, 573.4, 539.14, 501, 870.02, 340/539.3, 5.2, 539.12, 539.21, 3.1, 539.11, 340/539.32, 870.15, 10.1, 540, 5.61
See application file for complete search history.

(56) References Cited

U.S. PATENT DOCUMENTS

| | | | | |
|---|---|---|---|---|
| 5,619,189 | A * | 4/1997 | Sugawara | H04L 69/40 307/112 |
| 6,130,626 | A * | 10/2000 | Kane | G08G 1/0104 235/384 |
| 6,795,404 | B2 * | 9/2004 | Slemmer | H04L 12/2805 340/539.14 |

(Continued)

FOREIGN PATENT DOCUMENTS

| | | |
|---|---|---|
| DE | 10148625 A1 | 4/2003 |
| DE | 102010032775 A1 | 2/2012 |

(Continued)

OTHER PUBLICATIONS

European Office Action dated Apr. 1, 2016 for corresponding European Application no. 15 157 328.4.

*Primary Examiner* — Hoi Lau
(74) *Attorney, Agent, or Firm* — Renner, Otto, Boisselle & Sklar, LLP

(57) ABSTRACT

A power tool system includes a plurality of tool devices. Each of the tool devices includes a condition detection unit that detects condition information of the tool device and a communication unit capable of performing bidirectional wireless communication with a further one of the tool devices. The communication unit is configured to obtain the condition information of the tool device from the condition detection unit and transmit the obtained condition information of the tool device to the further one of the tool devices.

5 Claims, 3 Drawing Sheets

(51) Int. Cl.
*H04W 88/04* (2009.01)
*H04L 29/08* (2006.01)

(56) References Cited

U.S. PATENT DOCUMENTS

| | | | | |
|---|---|---|---|---|
| 7,263,379 B1* | 8/2007 | Parkulo | ................. | G08B 21/02 340/501 |
| 7,928,845 B1* | 4/2011 | LaRosa | ............. | G08B 13/1427 340/539.21 |
| 2003/0001743 A1* | 1/2003 | Menard | ............... | A61B 5/0002 340/573.1 |
| 2004/0174264 A1* | 9/2004 | Reisman | .................. | G07C 1/10 340/573.4 |
| 2008/0084330 A1* | 4/2008 | Picard | .................... | G01D 4/004 340/870.02 |
| 2008/0196910 A1* | 8/2008 | Radle | ....................... | G01V 3/15 173/2 |
| 2008/0238609 A1* | 10/2008 | Wiesner | ............ | G08B 13/1409 340/5.2 |
| 2009/0096604 A1* | 4/2009 | Battista | ................ | G01S 5/0027 340/539.3 |
| 2009/0254203 A1* | 10/2009 | Gerold | ..................... | B25C 1/08 700/87 |
| 2009/0273436 A1* | 11/2009 | Gluck | .................. | H04W 12/08 340/5.2 |
| 2009/0273467 A1* | 11/2009 | Elixmann | ............. | A61B 5/1112 340/539.12 |
| 2011/0074353 A1 | 3/2011 | Miwa et al. | | |
| 2011/0121938 A1* | 5/2011 | Slemmer | .................. | G05B 13/028 340/3.1 |
| 2011/0156898 A1* | 6/2011 | Taillefer | .................. | G08B 1/08 340/539.11 |
| 2011/0260863 A1* | 10/2011 | Hooli | .................... | G01S 5/0009 340/539.32 |
| 2012/0019400 A1* | 1/2012 | Patel | ...................... | G08C 17/00 340/870.15 |
| 2012/0092132 A1* | 4/2012 | Holme | ................. | A01K 11/008 340/10.1 |
| 2013/0009776 A1* | 1/2013 | Hicks, III | ............. | H04M 1/575 340/540 |
| 2013/0207778 A1* | 8/2013 | Neafsey | .................. | H04M 1/7253 340/5.61 |
| 2014/0070924 A1* | 3/2014 | Wenger | .................... | B25F 5/00 340/10.1 |
| 2014/0151079 A1* | 6/2014 | Furui | ....................... | B25F 5/02 173/46 |
| 2014/0159920 A1* | 6/2014 | Furui | ....................... | B25F 5/02 340/870.07 |
| 2014/0184397 A1* | 7/2014 | Volpert | .................. | G05B 19/05 340/12.51 |
| 2014/0253326 A1* | 9/2014 | Cho | ....................... | H04W 4/22 340/539.13 |
| 2016/0005295 A1* | 1/2016 | Ikeda | .................... | G08B 21/18 340/539.1 |
| 2016/0006280 A1* | 1/2016 | Ikeda | .................... | H02J 7/0042 320/107 |

FOREIGN PATENT DOCUMENTS

| | | |
|---|---|---|
| DE | 102011121448 A1 | 6/2013 |
| EP | 2 573 630 A1 | 3/2013 |
| EP | 2617529 A2 | 7/2013 |
| JP | 2011-072138 A | 4/2011 |
| WO | WO 2013/014914 A2 | 1/2013 |
| WO | WO 2014/008627 A1 | 1/2014 |

* cited by examiner

POWER TOOL SYSTEM

CROSS-REFERENCE TO RELATED APPLICATIONS

This application is based upon and claims the benefit of priority from prior Japanese Patent Application No. 2014-136098, filed on Jul. 1, 2014, the entire contents of which are incorporated herein by reference.

BACKGROUND OF THE INVENTION

The present invention relates to a power tool system.

Power tools, such as power drivers and impact wrenches, conventionally use battery packs (rechargeable batteries) as power supply. Such a battery pack is attached in a removable manner to a power tool body (e.g., refer to Japanese Laid-Open Patent Publication No. 2011-72138). As a result, power cords, which are used to electrically connect to an external power supply, such as a commercial power supply, are removed from power tools. This eliminates inconvenience of handling power cords during operations and also allows power tools to be used at a location where no external power supply is available. Thus, power tools are widely used, for example, in a construction site (building site), lines of a factory, and a typical household.

SUMMARY OF THE INVENTION

As described above, such power tools are used in a construction site (building site), lines of a factory, or the like. In such situations, a plurality of power tools may be used. However, it is difficult to recognize information of each of tool devices including each power tool, a battery pack attached to the power tool, and a charger charging the battery pack. Thus, there is room for improvement from the aspect of convenience.

One aspect of the present invention is a power tool system that includes a plurality of tool devices. Each of the tool devices includes a condition detection unit that detects condition information of the tool device and a communication unit capable of performing bidirectional wireless communication with a further one of the tool devices. The communication unit is configured to obtain the condition information of the tool device from the condition detection unit and transmit the obtained condition information of the tool device to the further one of the tool devices.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of a power tool system will now be described with reference to the drawings.

Figure 1:
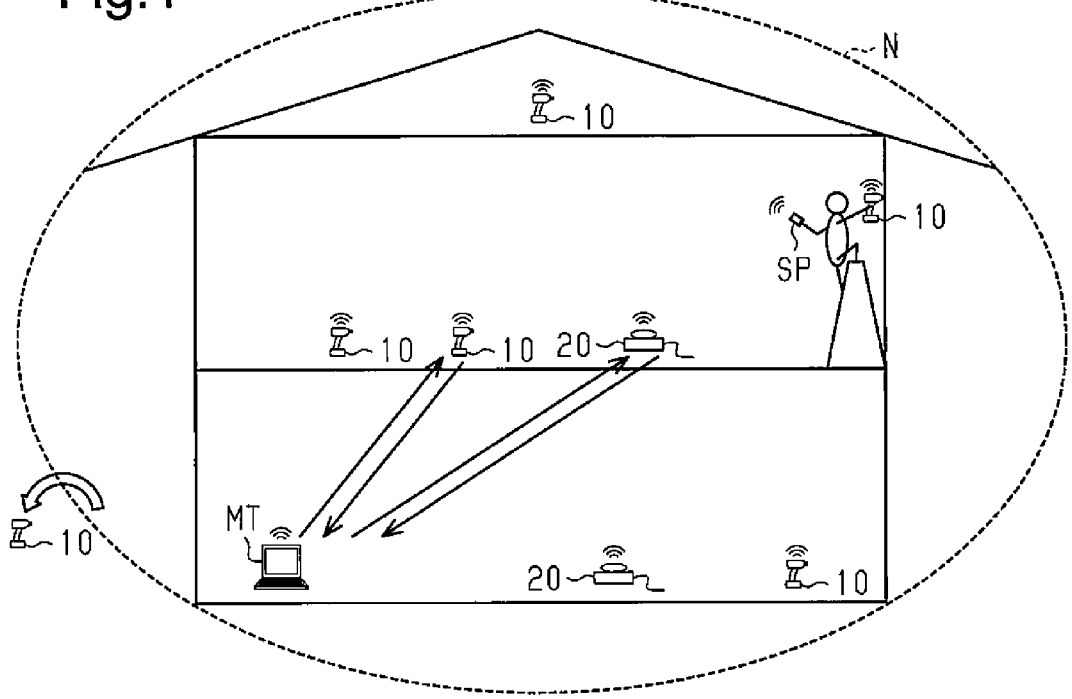
FIG. 1 is a schematic diagram of the structure of an embodiment of a power tool system.

As shown in FIG. 1, a power tool system includes a plurality of tool devices 10, 20. The tool devices include a plurality of power tools 10 and a plurality of chargers 20.

Figure 2:
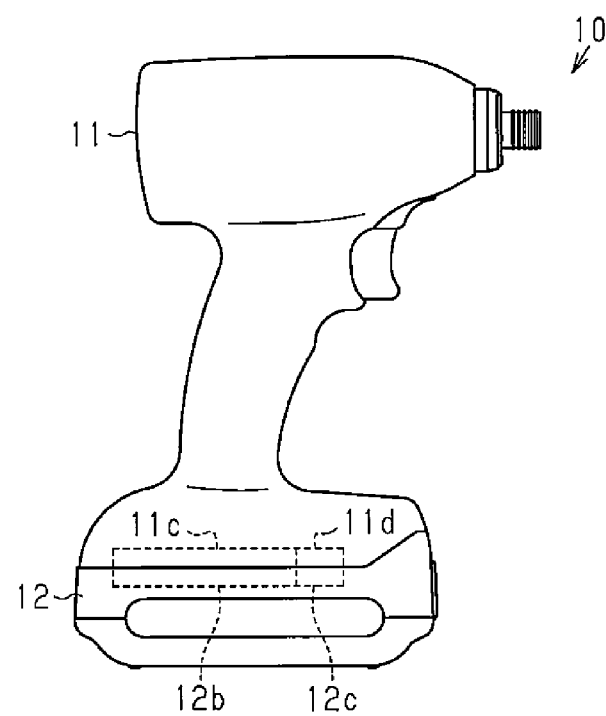
FIG. 2 is a schematic diagram illustrating the structure of a power tool of the power tool system of the embodiment.

As shown in FIG. 2, each power tool 10 includes a battery pack 12 that is attached in a removable manner to a power tool body 11.

Figure 3:
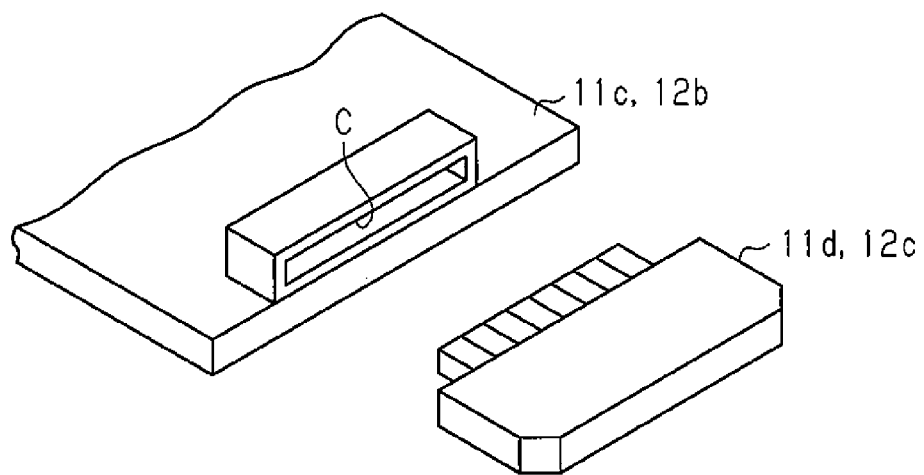
FIG. 3 is a schematic diagram illustrating the structure of a communication unit of the power tool system of the embodiment.
Figure 6:
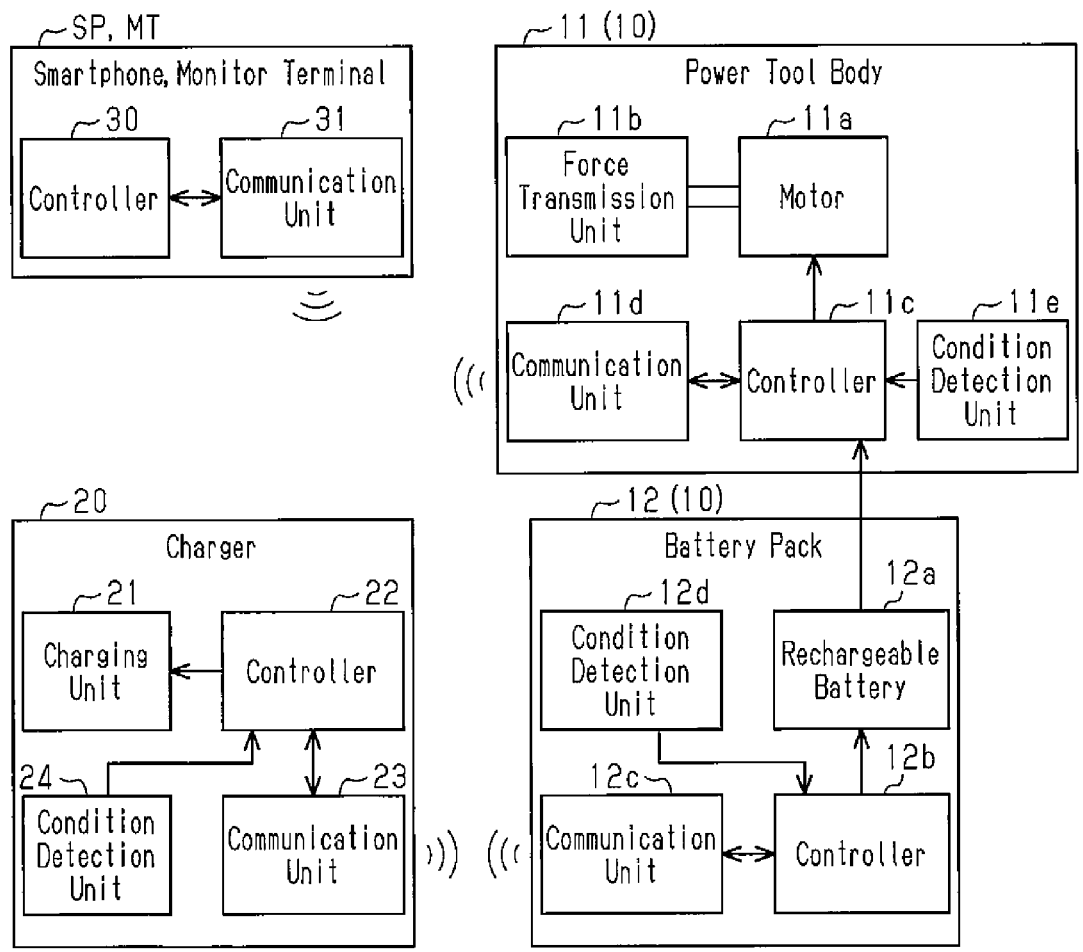
FIG. 6 includes block diagrams illustrating the schematic structure of the power tool system of the embodiment.

As shown in FIG. 6, the power tool body 11 includes a motor 11a driven to generate rotation, a force transmission unit 11b transmitting a rotational driving force from the motor 11a to a tip tool, a controller 11c controlling rotation of the motor 11a, and a communication unit 11d performing communication with an external device. As shown in FIGS. 2 and 3, the controller 11c includes a connector C used to electrically connect to the communication unit 11d. When fitted to the connector C of the controller 11c, the communication unit 11d is electrically connected to the controller 11c. The power tool body 11 also includes a condition detection unit 11e that detects its own condition. For example, the condition detection unit 11e detects information of a condition, such as whether or not the motor 11a is activated or driving torque information, and outputs the detected condition information to the controller 11c.

The battery pack 12 includes a rechargeable battery 12a formed by at least one cell, a controller 12b controlling the rechargeable battery 12a, and a communication unit 12c performing communication with an external device. As shown in FIGS. 2 and 3, the controller 12b includes a connector C used to electrically connect to the communication unit 12c. When fitted to the connector of the controller 12b, the communication unit 12c is electrically connected to the controller 12b. The battery pack 12 also includes a condition detection unit 12d that detects its own condition. For example, the condition detection unit 12d detects information of a condition, such as the temperature of the battery pack 12, the supplied voltage, or the state of charge, and outputs the detected condition information to the controller 12b.

As shown in FIG. 6, the charger 20 includes a charging unit 21 charging the rechargeable battery 12a of the battery pack 12, a controller 22 controlling the charging unit 21, and a communication unit 23 performing communication with an external device.

Figure 4:
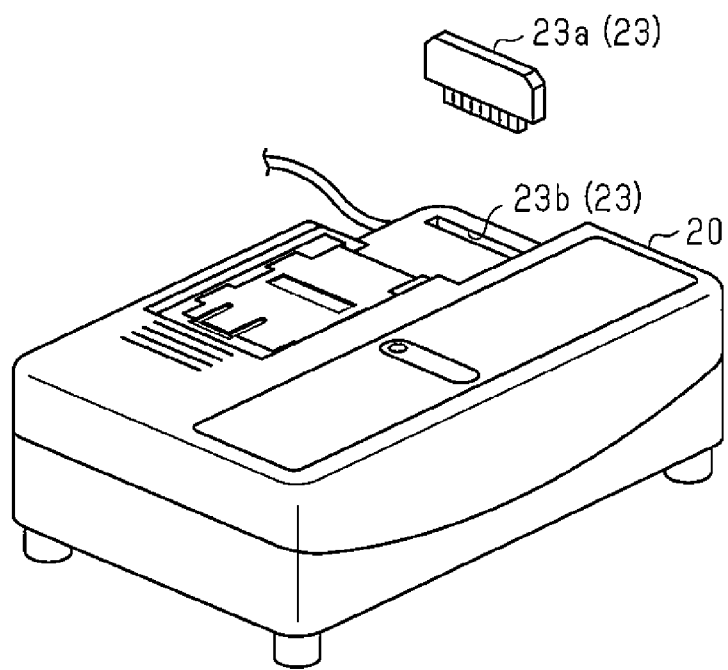
FIG. 4 is a schematic diagram illustrating the structure of a charger of the power tool system of the embodiment.

As shown in FIG. 4, the communication unit 23 of the charger 20 includes a card-type communication body 23a, which can be fitted to a slot 23b. When the communication body 23a is fitted to the slot 23b, the charger 20 is included in the communication unit 23.

The charger 20 also includes a condition detection unit 24 that detects the condition of the charger 20. For example, the condition detection unit 24 detects information of a condition, such as whether or not the battery pack 12 is charged, and outputs the detected condition information to the controller 22.

In the power tool system of the present embodiment, a network N is formed mainly by the communication units 11d, 12c, 23 respectively included in the power tool body 11, the battery pack 12, and the charger 20.

For example, the power tool system of the present embodiment may include a monitor terminal MT and a smartphone SP possessed by a user, each of which functions as a dedicated terminal capable of communicating with each of the communication units 11d, 12c, 23. The smartphone SP and the monitor terminal MT, each of which includes a controller 30 and a communication unit 31, are capable of communicating with each of the tool devices 11, 12, 20. The communication units 11d, 12c, 23 are each configured to perform communication based on information that is predetermined and shared between the communication units 11d, 12c, 23 and the smartphone SP and the monitor terminal MT, each of which serves as a mobile terminal.

The network N of the power tool system of the present embodiment will now be described.

As described above, the power tool body 11, the battery pack 12, and the charger 20 include the communication units 11d, 12c, 23, respectively. For example, the communication units 11d, 12c, 23 each have a communication standard (e.g., Bluetooth (registered trademark) or ZigBee (registered trademark)) that is the same as those of the communication units 31 of the monitor terminal MT and the smartphone SP.

Figure 5:
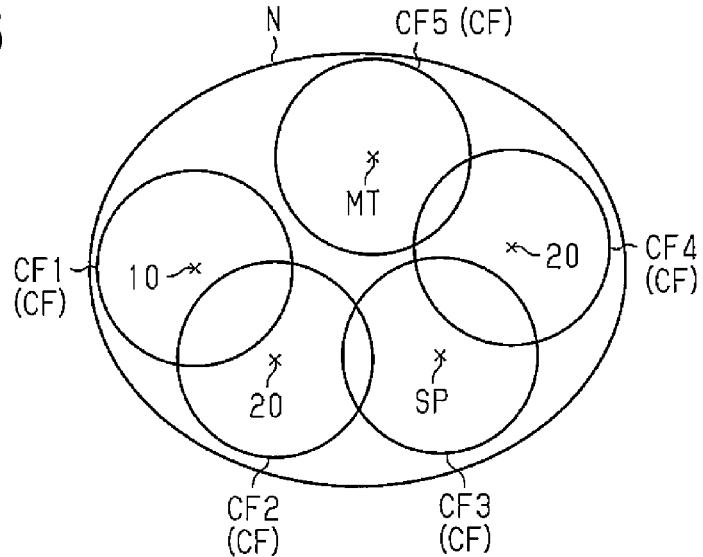
FIG. 5 is a diagram illustrating the concept of a network of the power tool system of the embodiment.

As shown in FIG. 5, the network N is formed when the communication field CF (area in which communication can be performed) of one of the communication units 11d, 12c, 23 overlaps the communication field CF (area in which communication can be performed) of another one of the communication units 11d, 12c, 23. Thus, in the network N, communication can be performed in an area larger than each communication field CF. For example, as shown in FIG. 5, a communication field CF1 overlaps a communication field CF2, and the communication field CF2 overlaps a communication field CF3. Further, the communication field CF3 overlaps a communication field CF4, and the communication field CF4 overlaps a communication field CF5.

Additionally, the power tool body 11, the battery pack 12, and the charger 20 each include a memory (not shown). Each of the power tool body 11, the battery pack 12, and the charger 20 is configured to temporarily store, in the memory, information including the condition information obtained via the associated one of the communication units 11d, 12c, 23. Each of the controllers 11c, 12b, 22 of the tool devices 11, 12, 20 outputs (transmits), via the associated one of the communication units 11d, 12c, 23, to the other tool devices 11, 12, 20, the smartphone SP, and the monitor terminal MT, the condition information of the other tool devices 11, 12, 20 in addition to its condition information.

The operation of the present embodiment will now be described.

In the power tool system of the present embodiment, various types of communication are performed in the network N formed by the tool devices 11, 12, 20 and other devices including the smartphone SP and the monitor terminal MT. For example, each of the tool devices 11, 12, 20 outputs its condition information to the other tool devices 11, 12, 20, the smartphone SP, and the monitor terminal MT that are included in its communication field CF.

The tool devices 11, 12, 20 of the present embodiment each have a relay function. More specifically, each of the tool devices 11, 12, 20 receives the condition information of the other tool devices 11, 12, 20 and temporarily stores the received condition information in the memory (not shown). Each of the tool devices 11, 12, 20 outputs (transmits) the stored condition information to the other tool devices 11, 12, 20 that have not transmitted the condition information and to the smartphone SP and the monitor terminal MT.

The movement of the condition information will now be described with reference to FIG. 5.

As shown in FIG. 5, the network N includes, for example, one power tool 10, two chargers 20a, 20b, one smartphone SP, and one monitor terminal MT. The communication field CF1 of the power tool 10 overlaps the communication field CF2 of the charger 20a. Thus, the power tool 10 transmits the condition information of the power tool 10 to the charger 20a, and the charger 20a transmits the condition information of the charger 20a to the power tool 10. That is, the condition information of the power tool 10 and the condition information of the charger 20a are reciprocally transmitted.

The charger 20a stores the condition information of the power tool 10 in the memory. The communication field CF2 of the charger 20a overlaps the communication field CF3 of the smartphone SP. Thus, the charger 20a transmits its condition information and the condition information of the power tool 10 to the smartphone SP.

The smartphone SP stores the condition information of the power tool 10 and the condition information of the charger 20a in the memory. The communication field CF3 of the smartphone SP overlaps the communication field CF4 of the charger 20b. Thus, the smartphone SP transmits the condition information of the power tool 10 and the condition information of the charger 20a to the charger 20b. Additionally, a dedicated application program is installed on the smartphone SP. Thus, the smartphone SP is configured to display the received condition information of each of the tool devices 10, 20a, 20b. This allows a user to browse the condition information of each of the tool devices 10, 20a, 20b using the smartphone SP.

When receiving the condition information of the power tool 10 and the condition information of the charger 20a from the smartphone SP, the charger 20b stores the received condition information of the power tool 10 and the charger 20a in the memory. The communication field CF4 of the charger 20b overlaps the communication field CF5 of the monitor terminal MT. Thus, the charger 20b transmits its condition information and the stored condition information of the power tool 10 and the charger 20a to the monitor terminal MT.

A dedicated application program is installed on the monitor terminal MT in advance. Thus, the monitor terminal MT is configured to display the received condition information of the power tool 10 and the two chargers 20a, 20b. This allows the user to browse the condition information of the power tool 10 and the condition information of the two chargers 20a, 20b using the monitor terminal MT.

Additionally, each of the power tool 10 and the chargers 20a, 20b periodically performs reciprocal communication with other devices. Thus, when the same process is performed in an order reversed to the above movement, the power tool 10 stores the condition information of the two chargers 20a, 20b.

As described above, the monitor terminal MT and the smartphone SP display the condition information of the power tool 10 and the charger 20. However, based on the condition information of at least one of the power tool 10 and the charger 20, the monitor terminal MT and the smartphone SP may perform a function other than displaying or control the corresponding one of the power tool 10 and the charger 20. For example, as shown in FIG. 1, the monitor terminal MT monitors the state of charge as the condition information of the power tool 10 (battery pack 12). When the state of charge becomes less than a predetermined value, the monitor terminal MT performs a notification, such as a display that prompts the user to charge the power tool 10

(battery pack 12). Additionally, the power tool 10 includes a notifying unit capable of displaying or outputting a sound. The monitor terminal MT has the power tool 10 output a signal for prompting the user to charge the power tool 10 (battery pack 12). Additionally, the monitor terminal MT monitors whether or not charging is performed, which is the condition information of the charger 20, and the state of charge, which is the condition information of the power tool 10 (battery pack 12) charged by the charger 20. When the state of charge of the power tool 10 (battery pack 12) exceeds a predetermined value (e.g., fully charged state), the monitor terminal MT outputs a signal to the charger 20 so that the charger 20 stops charging. When receiving the signal, the charger 20 stops charging.

The present embodiment has the advantages described below.

(1) The communication units 11*d*, 12*c*, 23 output the condition information of the tool device detected by the associated one of the condition detection units 11*e*, 12*d*, 24 to the other tool devices 11, 12, 20. This allows reciprocal communication, through which the condition information (e.g., the state of charge of the battery pack 12) may be output to the other remote tool devices 11, 20. Thus, the condition information may be shared. This improves convenience.

(2) The communication units 11*d*, 12*c*, 23 each have a communication protocol that is the same as those of the smartphone SP, which is a mobile terminal of a user, and the monitor terminal MT. Thus, the smartphone SP and the monitor terminal MT can communicate with the communication units 11*d*, 12*c*, 23. This allows the user to monitor the condition information at a location separated from the power tool 10 and the charger 20. Thus, convenience may be further improved.

(3) The communication units 11*d*, 12*c*, 23 each output, to the smartphone SP and the monitor terminal MT, the condition information of the tool devices 11, 12, 20 detected by the associated one of the condition detection units 11*e*, 12*d*, 24. This allows the user to monitor the condition information at a location separated from the power tool 10 and the charger 20. Thus, convenience may be further improved.

(4) The tool devices 11, 12, 20 include the controllers 11*c*, 12*b*, 22, respectively. When the communication units 11*d*, 12*c*, 23 receive control signals from the monitor terminal MT, the controllers 11*c*, 12*b*, 22 control the tool devices 11, 12, 20, respectively, based on the control signals. Thus, the tool devices 11, 12, 20 may each be controlled using the monitor terminal MT. This further improves convenience.

(5) The communication units 11*d*, 12*c*, 23 are each configured to be capable of outputting the condition information of the other tool devices 11, 12, 20 received from the corresponding one of the tool devices 11, 12, 20, in addition to the condition information of the tool devices 11, 12, 20 detected by the condition detection units 11*e*, 12*d*, 24, respectively. Consequently, even when each of the tool devices 11, 12, 20 has a small communication field CF, a relay formation may be used to output the condition information to the tool devices 11, 12, 20, the smartphone SP, and the monitor terminal MT that are excluded from the communication field CF. That is, the network can be expanded.

It should be apparent to those skilled in the art that the present invention may be embodied in many other specific forms without departing from the scope of the invention. Particularly, it should be understood that the present invention may be embodied in the following forms.

In the embodiment, for example, when a predetermined time (e.g., one hour) elapses after the tool devices 11, 12, 20 included in the network N are activated, a sound, vibration, or the like may be used to perform a warning. Additionally, such information may be transmitted to the other tool devices 11, 12, 20, the smartphone SP, and the monitor terminal MT included in the network N. In this case, the device that receives the information may perform the same operation. Additionally, the tool devices 11, 12, 20, which are capable of communicating with an external device, may perform a warning when left unattended in a working site.

For example, when excluded from the network N, the power tool 10 and the charger 20, whose communication field CF is out of the network N, cannot perform communication. In this case, the monitor terminal MT and the smartphone SP may be notified of such a condition by employing a notification structure. Employment of such a structure allows a user (owner) to be notified of a situation when a device, such as the power tool 10 or the charger 20, is, for example, stolen and excluded from the network N. Additionally, the power tool 10 and the charger 20 each may employ a structure that performs a warning by a sound or light when excluded from the network N.

Although, in the embodiment, the communication unit 23 (23*a*) is attached in a removable manner to the charger 20, there is no limit to such a configuration. The communication unit 23 (23*a*) may be fixed to the charger 20. Additionally, the communication units 11*d*, 12*c* may each be attached in a removable manner or fixed to the power tool body 11 and the battery pack 12, respectively.

Although the embodiment uses a drill driver, which is a type of power tools in the power tool system, there is no limit to such a configuration. For example, power tools of different types, such as a combination of a drill driver and an impact driver, may perform communication in a network system.

Although the embodiment employs the smartphone SP and the monitor terminal MT, each of which serves as a mobile terminal, there is no limit to such a configuration. A tablet terminal, a note-type terminal (note PC), and the like may be employed.

The embodiments and the modified examples may be combined.

The present disclosure includes the embodiments described below.

Embodiment 1

A power tool system includes a plurality of tool devices. Each of the tool devices includes a condition detection unit that detects condition information of the tool device and a communication unit capable of performing bidirectional wireless communication with a further one of the tool devices. The communication unit is configured to obtain the condition information of the tool device from the condition detection unit and transmit the obtained condition information of the tool device to the further one of the tool devices.

Embodiment 2

In the power tool system according to embodiment 1, each of the tool devices includes a tool device body that includes a connector attached in a removable manner to the communication unit.

Embodiment 3

The power tool system according to embodiment 1 further includes at least one mobile terminal having a communication protocol that is the same as those of the tool devices. The communication unit of each of the tool devices is configured to perform communication with the at least one mobile terminal.

Embodiment 4

In the power tool system according to embodiment 3, the communication unit of each of the tool devices is configured to perform communication based on information that is predetermined and shared between the communication unit and the at least one mobile terminal.

Embodiment 5

In the power tool system according to embodiment 1, the communication unit of each of the tool devices is configured to transmit, to another one of the tool devices and the mobile terminal that are capable of performing communication with the tool device, the condition information of the tool device obtained from the condition detection unit.

Embodiment 6

In the power tool system according to embodiment 5, when receiving the condition information of the tool device transmitted from at least one of the tool devices, the at least one mobile terminal generates a control signal based on the received condition information of the tool device and transmits the control signal to the at least one of the tool devices, which has transmitted the condition information of the tool device. Each of the tool devices includes a controller that controls the tool device based on the control signal when the communication unit receives the control signal transmitted from the at least one mobile terminal.

Embodiment 7

In the power tool system according to embodiment 1, when receiving the condition information of the tool device transmitted from the further one of the tool devices, the communication unit of each of the tool devices is configured to transmit, to another one of the tool devices and the mobile terminal that are capable of performing communication with the tool device, the received condition information of the tool device and the condition information of the tool device obtained from the condition detection unit.

The present examples and embodiments are to be considered as illustrative and not restrictive, and the invention is not to be limited to the details given herein, but may be modified within the scope and equivalence of the appended claims.

The invention claimed is:

1. A power tool system comprising:
   a plurality of tool devices, wherein each of the tool devices includes
   a condition detection unit that detects condition information of the tool device, and
   a communication unit capable of performing bidirectional wireless communication with a further one of the tool devices, wherein
   the communication unit is configured to obtain the condition information of the tool device from the condition detection unit and transmit the obtained condition information of the tool device to the further one of the tool devices,
   further comprising at least one mobile terminal having a communication protocol that is the same as those of the tool devices,
   wherein the communication unit of each of the tool devices is configured to perform communication with the at least one mobile terminal, and
   wherein the communication unit of each of the tool devices is configured to perform communication based on information that is predetermined and shared between the communication unit and the at least one mobile terminal.

2. The power tool system according to claim 1, wherein each of the tool devices includes a tool device body that includes a connector attached in a removable manner to the communication unit.

3. A power tool system comprising:
   a plurality of tool devices, wherein each of the tool devices includes
   a condition detection unit that detects condition information of the tool device, and
   a communication unit capable of performing bidirectional wireless communication with a further one of the tool devices, wherein
   the communication unit is configured to obtain the condition information of the tool device from the condition detection unit and transmit the obtained condition information of the tool device to the further one of the tool devices,
   further comprising at least one mobile terminal having a communication protocol that is the same as those of the tool devices,
   wherein the communication unit of each of the tool devices is configured to perform communication with the at least one mobile terminal, and
   wherein the communication unit of each of the tool devices is configured to transmit, to another one of the tool devices and the mobile terminal that are capable of performing communication with the tool device, the condition information of the tool device obtained from the condition detection unit.

4. The power tool system according to claim 3, wherein when receiving the condition information of the tool device transmitted from at least one of the tool devices, the at least one mobile terminal generates a control signal based on the received condition information of the tool device and transmits the control signal to the at least one of the tool devices, which has transmitted the condition information of the tool device, and
   each of the tool devices includes a controller that controls the tool device based on the control signal when the communication unit receives the control signal transmitted from the at least one mobile terminal.

5. The power tool system according to claim 1, wherein when receiving the condition information of the tool device transmitted from the further one of the tool devices, the communication unit of each of the tool devices is configured to transmit, to another one of the tool devices and the mobile terminal that are capable of performing communication with the tool device, the received condition information of the tool device and the condition information of the tool device obtained from the condition detection unit.

* * * * *